(12) United States Patent
Raj et al.

(10) Patent No.: US 6,220,710 B1
(45) Date of Patent: *Apr. 24, 2001

(54) ELECTRO-OPTIC PROJECTION DISPLAY WITH LUMINOSITY CHANNEL

(75) Inventors: Kannan Raj, Chandler; Ronald D. Smith, Phoenix, both of AZ (US)

(73) Assignee: Intel Corporation, Santa, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/313,814

(22) Filed: May 18, 1999

(51) Int. Cl.[7] .................................................. G03B 21/14
(52) U.S. Cl. ............................................ 353/20; 353/31
(58) Field of Search .............................. 353/20, 31, 34, 353/37; 349/5, 8, 9, 25

(56) References Cited

U.S. PATENT DOCUMENTS

| | | | | |
|---|---|---|---|---|
| 4,859,029 | * | 8/1989 | Durell | 350/173 |
| 5,363,222 | * | 11/1994 | Ledebuhr | 359/40 |
| 5,879,065 | * | 3/1999 | Shirochi et al. | 353/8 |

* cited by examiner

Primary Examiner—Safet Metjahic
Assistant Examiner—E P LeRoux
(74) Attorney, Agent, or Firm—Trop, Pruner & Hu, P.C.

(57) ABSTRACT

A luminosity channel may be provided in an electro-optic projection display by beam splitting the incident light source into first and second polarization beams. One polarization beam may be used to illuminate the three modulators for the three primary color channels. The other beam may be utilized to illuminate a white light modulator which provides a luminosity channel. The two beams may be recombined to produce the final image. As a result, in some embodiments, higher resolution, or wider color gamut, and better image quality may be achieved without unduly effecting the light efficiency of the display.

17 Claims, 1 Drawing Sheet

ELECTRO-OPTIC PROJECTION DISPLAY WITH LUMINOSITY CHANNEL

BACKGROUND

This invention relates generally to electro-optic projection displays such as liquid crystal projection displays.

It has been appreciated for some time that the addition of an luminosity channel to a projection display, including an electro-optic display, would be advantageous. The luminosity channel contains the lightness and darkness information and, viewed by itself, looks like a gray scale image. A substantial portion of the image detail exists in the luminosity channel. The luminosity channel uses white light while the conventional electro-optic display uses a set of three spatial light modulators for each of the primary color planes.

It is believed that luminosity channels have not been widely used heretofore, despite the understanding that the resolution of the projection display would be substantially enhanced. This may be because of the problem with light efficiency which arises from extracting a significant portion of the light for a four channel system. Thus, while those skilled in the art may appreciate the benefits of luminosity channel, it has not been widely adopted in practice.

One known approach to providing luminosity channel is utilized in the Texas Instruments digital mirror based projection engines. However, the luminosity channel is provided by field sequential addressing mode using a color wheel. The color wheel has slots for the primary color planes and two white light or luminosity channels. While time sequential approaches have some advantages, they also suffer from some problems. Firstly, their optical efficiency is low. Secondly, they suffer from color breakup. It is not believed that the addition of a luminosity channel in this fashion will sufficiently improve the overall characteristics of the display to make the addition of a luminosity channel cost effective.

Thus, there is a continuing need for a way to provide a luminosity channel without adversely effecting the characteristics of the overall display, including its light efficiency.

SUMMARY

In accordance with one aspect, a method of operating an electro-optic projection display includes generating a light source. The light from the source may be split into two separately polarized light beams. One polarized beam is used to form three color channels. The other polarized light beam is utilized to form a luminosity channel.

DETAILED DESCRIPTION

Figure 1:
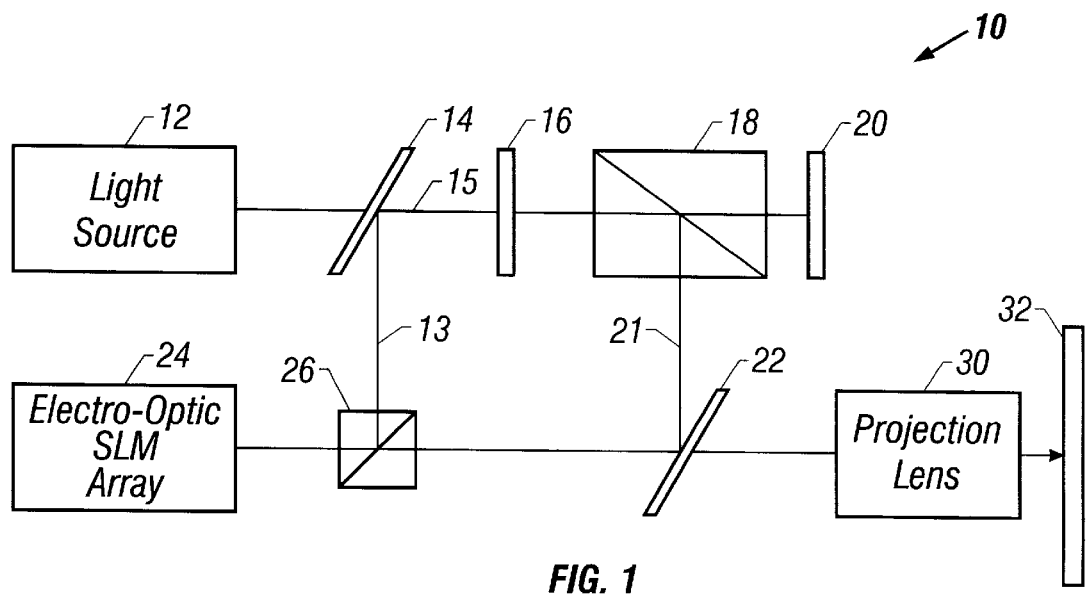
FIG. 1 is a schematic depiction of one embodiment of the present invention.

Referring to FIG. 1, a projection display 10 may include a light source 12. The light source may be conventional in all respects. It may include a point source of light, an element for focusing the light and any desired optical elements. A polarizing beam splitter 14 separates the light from the light source 12 into two polarized beams 13 and 15.

The beam 15 which is polarized in a first direction (such as the $\vec{p}$ direction) may be converted to the form of polarization ($\vec{s}$, for example) of the beam 15 using a half wave plate 16. The beam 15 (either in its original polarization without the half wave plate 16 or as converted to the opposite polarization) is then passed to a beam splitter 18. The beam 15 then illuminates a spatial light modulator 20.

Since the beam 15 is a white light beam, the white light spatial light modulator 20 provides a luminosity channel. The luminosity channel is a channel containing white light which may be used to improve the resolution of the display 10. The suitably modulated luminosity channel is then reflected by the beam splitter 18 along the path 21 to a beam combiner 22.

Meanwhile, the other polarization beam 13 is passed to a beam splitter 26 and is directed to an electro-optic spatial light modulating array 24. The array 24 creates modulated color planes. For example, in one embodiment of the present invention, a spatial light modulator may be utilized for each of the primary color planes. In other words, one polarization of the two possible polarizations is utilized to create the three color plane signals while the other polarization is utilized to produce the luminosity channel. The color plane information from the array 24 is combined with the luminosity channel information in the beam combiner 22. This signal is processed by a projection lens 30 and projected on a display 32.

The projection system 10 may be any of a variety of electro-optic devices including a liquid crystal display or a spatial light modulator that uses liquid crystal elements. The system may based on reflection or transmission.

The mix of light along each of the paths 13 and 15 may be controlled by a variable ratio beam splitter in one embodiment. Thus, depending on the importance of the luminosity channel, any proportion of the overall light produced by the light source 12 can be dedicated to producing the luminosity channel. For example, half of white light may be split to each path 13 and 15 in one embodiment. In any case, the luminosity channel is provided through the use of a portion of the light source which would otherwise have been wasted. Thus, the provision of the luminosity channel does not significantly adversely effect the light efficiency of the display 10. As a result, in some embodiments, the resulting image may have greater brightness and better color gain in addition to better resolution. The light modulator 20 may be tuned to accept a wider band of wavelengths instead of the single wavelength that modulators are normally tuned to receive.

The efficiency of the system 10 may be improved by using good beam splitters which have high optical throughput. Most white light includes ultraviolet and infrared wavelengths that are normally discolored by optics. This restricts the available color gamut. Embodiments of this invention allow for wider color bandpass, extending the color gamut so as to take advantage of the true range of human color perception. For example, the display's light responsivity may be broadened to approximately 400 to 800 nanometers.

Some embodiments of the present invention may advantageously improve the light efficiency of the overall system due to polarization recovery. In addition, some embodiments may provide a way to improve the gray scale and color gamut of the images. Also, some embodiments may provide a way to increase the resolution of the images by using one modulator with higher resolution for the luminosity channel while lower resolution modulators may be used for the color planes.

Since the brightness of the resulting display may be increased, the lifetime of the lamp used as a light source may be increased as lower brightness settings may be utilized. Alternatively, lower wattage light bulbs may be used in embodiment of the present invention.

Figure 2:
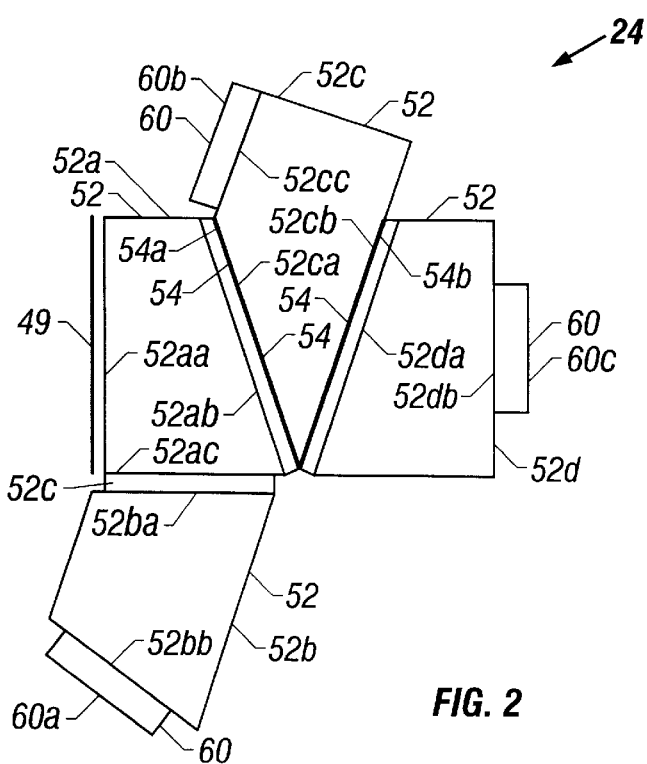
FIG. 2 is a depiction of an array of electro-optic spatial light modulators that may be utilized in connection with the embodiment shown in FIG. 1.

Referring to FIG. 2, an embodiment 24 of a color plane modulation array in accordance with the invention has electrical features to cause the convergence of modulated beams images (modulated red, green and blue images, for example) that collectively form a composite image on a screen 32. In some embodiments, the array 24 may be a liquid crystal display (LCD) projection system, and the display panels 60 may be reflective LCD display panels. Other arrangements are possible.

In some embodiments, the array 24 may include prisms 52 (prisms 52a, 52b, 52c and 52d, as examples) that direct an incoming beam of white light (formed from red, green and blue beams) from a light source 63 to the display panels 60, as described below. In particular, the prism 52a receives the incoming white beam of light at a prism face 52aa that is normal to the incoming light and directs the beam to a prism face 52ab that is inclined toward the face 52aa. The reflective face of a red dichroic mirror 54a may be mounted to the prism face 52ab or to the prism face 52ca by a transparent adhesive layer.

The red dichroic mirror 54a eseparates the red beam from the incoming white beam by reflecting the red beam so that the red beam exits another prism face 52ac of the prism 52a and enters a prism face 52ba of the prism 52b. The prism faces 52ac and 52ba may be mounted together via a transparent adhesive layer. The prism 52b, in turn, directs the red beam to the incident face of the display panel 60a that is mounted to another prism face 52bb of the prism 52b that is inclined toward the prism face 52ba. The display panel 60a modulates the incident red beam, and the modulated red beam follows a similar path to the path followed by the incident red beam.

The remaining blue and green beams (from the original incoming white beam) pass through the red dichroic mirror 54a. The opposite face of the mirror 54a is attached to a prism face 52ca of the prism 52c, an arrangement that causes the blue and green beams to pass through the red dichroic mirror 54a, pass through the prism face 52ca of the prism 52c, travel through the prism 52c and pass through a prism face 52cb (of the prism 52c) that forms an acute angle with the prism face 52ca. The reflective face of a blue dichroic mirror 54b is mounted to the prism face 52cb. As a result, the blue dichroic mirror 54b reflects the blue beam back into the prism 52c to cause the blue beam to exit another prism face 52cc of the prism 52c. The incident face of the display panel 60b is mounted to the face 52cc and modulates the incident blue beam. The modulated blue beam, in turn, follows a path similar to the path followed by the incident blue beam.

The green beam passes through the blue dichroic mirror 54b and enters the prism 52d through a prism face 52da that may be mounted to the other face of the blue dichroic mirror 54b via a transparent adhesive layer. The green incident beam exits another prism face 52db of the prism 52d to strike the incident face of the display panel 60c that is mounted to the prism face 52db. The display panel 60c modulates the incident green beam before reflecting the modulated green beam along a path similar to the path followed by the incident green beam. The beam splitter 26 directs the modulated green beam through the projection lens 30. The three modulated beam images form a color composite image on the screen 32.

The system 24 depicted in FIG. 2 is an example of one of many possible embodiments of the invention. Other modulation systems, prism arrangements and optical systems are possible.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method of operating an electro-optic projection display comprising:

generating a light source;

splitting the light from said source into two separately polarized beams including a first beam of a first polarization and a second beam of a second polarization, said first and second polarizations being different polarizations;

forming three color plane channels using said first polarized beam;

forming a luminosity channel using said second polarized beam; and converting said first and second polarized beams to the same polarization.

2. The method of claim 1 wherein splitting the light source into two separately polarized beams includes splitting the light source equally into two separately polarized beams.

3. The method of claim 1 further including combining said three color plane channels and said luminosity channel and projecting said color plane channels and luminosity channel onto a projection screen.

4. The method of claim 1 wherein forming three color plane channels includes using a set of three spatial light modulators to form said color plane channels and using a separate spatial light modulator to form said luminosity channel.

5. An electro-optic projection display comprising:

a light source;

a variable ratio beam splitter to split the light from said light source into two separately polarized beams in unequal percentages;

a first electro-optic device to form three modulated primary color channels; and a second electro-optic device to modulate a white light channel. modulators to form said color plane channels and using a separate spatial light modulator to form said luminosity channel.

6. The display of claim 5 further including a half wave plate to convert the polarization of one of said polarized beams to the polarization of the other of said polarized beams.

7. The display of claim 5 wherein said first and second electro-optic devices are spatial light modulators.

8. The display of claim 7 wherein said spatial light modulators use liquid crystal devices.

9. The display of claim 5 wherein said first electro-optic device is adapted to form three modulated primary color channels using three spatial light modulators, one for each primary color channel.

10. The display of claim 5 including a combiner to combine the light produced by said first and second electro-optic devices.

11. An electro-optic projection display comprising:

a spatial light modulator to produce a luminosity channel;

a light source;

a variable ratio beam splitter to split light from said light source into first and second oppositely polarized beams in unequal percentages, one of said oppositely polarized beams to form the light for said luminosity channel; and a half wave plate to convert the polarization of said first polarized beam to the polarization of the second polarized beam.

12. The display of claim 11 including a spatial light modulator forming a color channel.

13. The display of claim 12 wherein said spatial light modulators use liquid crystal devices.

14. The display of claim 12 including three spatial light modulators adapted to form three modulated primary color channels, one for each primary color channel.

15. The display of claim 14 including a combiner to combine the first and second polarized beams.

16. The display of claim 12, including a high resolution spatial light modulator for said luminosity channel and lower resolution spatial light modulators for said color channels.

17. The display of claim 16 wherein said luminosity channel is adapted to broaden the light responsivity of said display to approximately 400 to 800 nanometers.

\* \* \* \* \*

UNITED STATES PATENT AND TRADEMARK OFFICE
CERTIFICATE OF CORRECTION

PATENT NO.    : 6,220,710 B1
DATED         : April 24, 2001
INVENTOR(S)   : Kannan Raj and Ronald D. Smith It is certified that error appears in the above-identified patent and that said Letters Patent is hereby corrected as shown below:

Column 4,
Lines 48-50, delete "modulators to form said color plane channels and using a separate spatial light modulator to form said luminosity channel."

Column 6,
Line 13, insert "18. The display of claim 5, wherein said beam splitter splits the light source into two substantially equal portions."

Signed and Sealed this

Sixteenth Day of April, 2002

Attest:

JAMES E. ROGAN
Attesting Officer
Director of the United States Patent and Trademark Office